US012079171B2

(12) United States Patent
Nichols

(10) Patent No.: US 12,079,171 B2
(45) Date of Patent: Sep. 3, 2024

(54) SYMBOLIC LINK BASED PLACEHOLDERS

(71) Applicant: MICROSOFT TECHNOLOGY LICENSING, LLC, Redmond, WA (US)

(72) Inventor: Jack Allen Nichols, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 682 days.

(21) Appl. No.: 15/225,851

(22) Filed: Aug. 2, 2016

(65) Prior Publication Data

US 2018/0039652 A1    Feb. 8, 2018

(51) Int. Cl.
*G06F 16/178* (2019.01)
*G06F 3/06* (2006.01)
(Continued)

(52) U.S. Cl.
CPC .......... *G06F 16/178* (2019.01); *G06F 3/0608* (2013.01); *G06F 3/065* (2013.01);
(Continued)

(58) Field of Classification Search
CPC ........... G06F 17/30174; G06F 17/3007; G06F 17/30194; G06F 17/30067;
(Continued)

(56) References Cited

U.S. PATENT DOCUMENTS 5,634,122 A * 5/1997 Loucks ..................... G06F 9/52
6,343,316 B1   1/2002 Sakata
(Continued)

FOREIGN PATENT DOCUMENTS

CN   105378711 A   3/2016
CN   105431838 A   3/2016
(Continued)

OTHER PUBLICATIONS

Azab, et al., "Stroll: A Universal Filesystem-Based Interface for Seamless Task Deployment in Grid Computing", In Proceedings of the International Federation for Information Processing, Jun. 13, 2012, pp. 162-176.
(Continued)

*Primary Examiner* — Tony Mahmoudi
*Assistant Examiner* — Kamal K Dewan
(74) *Attorney, Agent, or Firm* — Newport IP, LLC; Jacob P. Rohwer

(57) ABSTRACT

Symbolic link based placeholders are used for cloud stored data synchronization. To synchronize cloud stored data, placeholders may be implemented as bidirectional symbolic links to a location that has a custom virtual file system (VFS) mounted. When a symbolic link is opened, the operating system may be directed to the custom VFS. The custom VFS may hydrate the file through a synchronization engine, and place the hydrated file at the location of the original symbolic link. The custom VFS may then redirect back to the primary file system of the operating system to allow the operation on the file to complete. Complexity and resource consumption may be reduced by passing placeholder requests instead of all requests through the custom VFS.

20 Claims, 11 Drawing Sheets

(51) Int. Cl.
  *G06F 9/451* (2018.01)
  *G06F 9/50* (2006.01)
  *G06F 16/10* (2019.01)
  *G06F 16/11* (2019.01)
  *G06F 16/182* (2019.01)
  *G06F 16/188* (2019.01)

(52) U.S. Cl.
  CPC ............. *G06F 3/067* (2013.01); *G06F 9/452* (2018.02); *G06F 9/50* (2013.01); *G06F 16/10* (2019.01); *G06F 16/11* (2019.01); *G06F 16/182* (2019.01); *G06F 16/188* (2019.01)

(58) Field of Classification Search
  CPC ...... G06F 17/30233; G06F 9/452; G06F 9/50; G06F 3/0685; G06F 16/178; G06F 16/182; G06F 16/188; G06F 16/10; G06F 16/11; G06F 9/30233; G06F 3/0608; G06F 3/065; G06F 3/067
  USPC ........................................................ 707/611
  See application file for complete search history.

(56) References Cited

U.S. PATENT DOCUMENTS

| | | | |
|---|---|---|---|
| 6,356,915 | B1 | 3/2002 | Chtchetkine et al. |
| 6,446,091 | B1 | 9/2002 | Noren |
| 7,266,555 | B1 | 9/2007 | Coates et al. |
| 7,779,034 | B2 | 8/2010 | Pedersen et al. |
| 8,099,758 | B2 | 1/2012 | Schaefer et al. |
| 8,276,137 | B2 | 9/2012 | Doyle et al. |
| 8,412,754 | B2 | 4/2013 | Chen et al. |
| 8,706,971 | B1 | 4/2014 | Nayak |
| 8,751,604 | B2 | 6/2014 | Liebman |
| 8,768,898 | B1 | 7/2014 | Trimmer et al. |
| 8,799,414 | B2 | 8/2014 | Taylor et al. |
| 8,880,580 | B2 | 11/2014 | Simmons et al. |
| 9,020,992 | B1 † | 4/2015 | Gunda |
| 9,069,829 | B2 | 6/2015 | Kwiatkowski et al. |
| 9,087,076 | B2 | 7/2015 | Nickolov et al. |
| 9,104,340 | B2 | 8/2015 | Prahlad et al. |
| 9,166,866 | B2 | 10/2015 | Novak et al. |
| 9,218,350 | B2 | 12/2015 | Novak et al. |
| 9,235,587 | B2 | 1/2016 | Hahn |
| 9,239,762 | B1 | 1/2016 | Gunda et al. |
| 9,239,860 | B1 | 1/2016 | Love et al. |
| 9,253,047 | B2 | 2/2016 | Mishra et al. |
| 9,396,209 | B2 | 7/2016 | Fukui et al. |
| 9,405,767 | B2 | 8/2016 | Novak et al. |
| 9,524,151 | B2 | 12/2016 | Chan et al. |
| 9,753,816 | B2 | 9/2017 | Mehta et al. |
| 11,368,528 | B2 | 6/2022 | Nichols et al. |
| 2004/0019613 | A1 | 1/2004 | Jones et al. |
| 2004/0133545 | A1* | 7/2004 | Kiessig ................. G06F 16/10 |
| 2004/0162876 | A1 | 8/2004 | Kohavi |
| 2005/0223047 | A1* | 10/2005 | Shah ................. G06F 17/30176 |
| 2006/0069662 | A1† | 3/2006 | Laborczfalvi et al. |
| 2006/0200570 | A1 | 9/2006 | Stirbu et al. |
| 2006/0259949 | A1* | 11/2006 | Schaefer ............. H04L 63/0428 726/1 |
| 2007/0123241 | A1 | 5/2007 | Arnold |
| 2007/0162419 | A1* | 7/2007 | Ahn ........................ G06F 16/13 |
| 2007/0214128 | A1 | 9/2007 | Smith et al. |
| 2009/0172274 | A1 | 7/2009 | Nochimowski et al. |
| 2009/0193107 | A1 | 7/2009 | Srinivasan et al. |
| 2009/0313702 | A1 | 12/2009 | Mandava |
| 2010/0030739 | A1* | 2/2010 | Lanjewar ................ G06F 16/16 707/828 |
| 2010/0293141 | A1 | 11/2010 | Anand et al. |
| 2012/0017261 | A1 | 1/2012 | Lim |
| 2012/0179553 | A1 | 7/2012 | Duggal |
| 2013/0014047 | A1 | 1/2013 | Joo et al. |
| 2013/0185258 | A1* | 7/2013 | Bestler ............. G06F 17/30197 707/638 |
| 2013/0198474 | A1 | 8/2013 | Shaath |
| 2013/0226876 | A1* | 8/2013 | Gati ....................... G06F 16/119 707/652 |
| 2013/0246393 | A1 | 9/2013 | Saraf et al. |
| 2013/0275375 | A1* | 10/2013 | Nickolov .............. G06F 9/4856 707/636 |
| 2013/0339471 | A1* | 12/2013 | Bhargava ............ G06F 11/1461 709/213 |
| 2014/0006465 | A1* | 1/2014 | Davis ................ G06F 17/30194 707/827 |
| 2014/0032691 | A1 | 1/2014 | Barton et al. |
| 2014/0032758 | A1 | 1/2014 | Barton et al. |
| 2014/0259005 | A1* | 9/2014 | Jeffrey ....................... G06F 8/65 717/173 |
| 2014/0289191 | A1 | 9/2014 | Chan et al. |
| 2014/0324776 | A1 | 10/2014 | Novak et al. |
| 2014/0324777 | A1 | 10/2014 | Novak et al. |
| 2014/0324945 | A1 | 10/2014 | Novak et al. |
| 2014/0330874 | A1* | 11/2014 | Novak ................. H04L 65/4069 707/827 |
| 2014/0337577 | A1* | 11/2014 | Burton ................. G06F 3/0617 711/114 |
| 2014/0358860 | A1 | 12/2014 | Wautier et al. |
| 2014/0372376 | A1† | 12/2014 | Smith et al. |
| 2015/0012495 | A1 | 1/2015 | Prahlad et al. |
| 2015/0052105 | A1 | 2/2015 | Nguyen |
| 2015/0067005 | A1* | 3/2015 | Avati ..................... G06F 16/183 707/827 |
| 2015/0254119 | A1 | 9/2015 | Gallardo et al. |
| 2015/0347447 | A1* | 12/2015 | Ho ..................... G06F 17/30174 707/622 |
| 2015/0365463 | A1 | 12/2015 | Quan et al. |
| 2016/0063027 | A1 | 3/2016 | Brand |
| 2016/0192178 | A1 | 6/2016 | Blong et al. |
| 2016/0291856 | A1 | 10/2016 | von muhlen et al. |
| 2016/0330256 | A1 | 11/2016 | Novak et al. |
| 2016/0359949 | A1 | 12/2016 | Hess et al. |
| 2017/0075907 | A1* | 3/2017 | Goswami ............. G06F 16/119 |
| 2017/0251257 | A1* | 8/2017 | OBrien ............. H04N 21/4622 |
| 2018/0041018 | A1* | 2/2018 | Abe ........................ H04L 45/02 |
| 2018/0046635 | A1 | 2/2018 | Nichols |
| 2018/0060345 | A1 | 3/2018 | Christiansen et al. |
| 2018/0084044 | A1 | 3/2018 | Nichols et al. |
| 2018/0084045 | A1 | 3/2018 | Nichols et al. |
| 2018/0246905 | A1* | 8/2018 | Besen ................. G06F 16/1794 |
| 2018/0329923 | A1 | 11/2018 | Brand |
| 2019/0272253 | A1 | 9/2019 | Vibhor et al. |
| 2022/0239741 | A1 | 7/2022 | Nichols et al. |

FOREIGN PATENT DOCUMENTS

| | | |
|---|---|---|
| CN | 105474200 A | 4/2016 |
| CN | 105493077 A | 4/2016 |
| GB | 2504402 A | 1/2014 |
| WO | 2009149416 A1 | 12/2009 |
| WO | 2014178906 A1 | 11/2014 |

OTHER PUBLICATIONS

"International Search Report and Written Opinion Issued in PCT Application No. PCT/US2017/043820", Mailed Date: Oct. 17, 2017, 14 Pages.

Shan, et al., "An Overlay File System for Cloud-Assisted Mobile Applications", In Proceedings of the 32nd Symposium on Mass Storage Systems and Technologies, May 2, 2016, 14 Pages.

Zhao, et al., "HyCache: a User-Level Caching Middleware for Distributed File Systems", In Proceedings of IEEE 27th International Symposium on Parallel & Distributed Processing Workshops and PhD Forum, May 20, 2013, pp. 1997-2006.

"Non Final Office Action in U.S. Appl. No. 15/271,185", Mailed Date: Jan. 11, 2019, 14 Pages.

"Goodsync Key feature", Retrieved From: https://web.archive.org/web/20150204051422/http://www.goodsync.com/features, Feb. 4, 2015, 5 Pages.

(56) References Cited

OTHER PUBLICATIONS

"How do I save space on my computer with selective sync?", Retrived From: https://web.archive.org/web/20160317041033/https://www.dropbox.com/en/help/175, Sep. 18, 2015, 4 Pages.
"Orchestration Dehydration and Rehydration", Retrieved From: https://docs.microsoft.com/en-us/biztalk/core/orchestration-dehydration-and-rehydration?redirectedfrom=MSDN, Feb. 27, 2009, 2 Pages.
"Set the default open behavior for browser-enabled documents (Office Web Apps when used with SharePoint 2013)", Retrived From: https://web.archive.org/web/20140205120234/https://technet.microsoft.com/en-us/library/ee837425.aspx, Nov. 13, 2012, 3 pages.
"Sync infinite cloud storage", Retrived from: https://web.archive.org/web/20161110113357/https://www.odrive.com/features/sync, Retrieved on: Jul. 13, 2016, 10 Pages.
"Final Office Action Issued In U.S. Appl. No. 15/271,199", Mailed Date: Sep. 18, 2018, 16 Pages.
"Non Final Office action Issued in U.S. Appl. No. 15/271,199", Mailed Date: Mar. 28, 2018, 17 Pages.
Cohen, Peter, "How to save disk space on your Mac by selectively syncing Dropbox folders", Retrieved From: http://www.imore.com/how-save-disk-space-your-mac-selectively-syncing-dropbox-folders, Apr. 23, 2014, 5 Pages.
Huculak, Mauro, "How to overcome the placeholder limitation of OneDrive in Windows 10", Retrived from: https://www.windowscentral.com/fix-placeholder-limitation-onedrive-windows-10, Sep. 4, 2015, 4 Pages.
Johnson, Aric, "A Gift to Designers from the Cloud Storage Gods", Retrieved From: https://medium.odrive.com/a-designers-gift-from-the-cloud-storage-gods-cdca39376858, Jun. 22, 2016, 9 Pages.
Paul, Ian, "How to use Google Drive's selective sync", Retrieved From: http://www.pcworld.com/article/3057217/google-apps/how-to-use-google-drives-selective-sync.html, Apr. 19, 2016, 4 Pages.
"International Search Report and Written Opinion Issued in PCT Application No. PCT/US17/051243", Mailed Date: Nov. 9, 2017, 13 Pages.
"International Search Report and Written opinion Issued in PCT Application No. PCT/US2017/051242", Mailed Date: Nov. 20, 2017, 11 Pages.
Rubino, Daniel, "Microsoft responds to Windows 10 OneDrive 'selective sync' controversy", Retrieved From: https://www.windowscentral.com/microsoft-responds-windows-10-onedrive-selective-sync, Nov. 14, 2014, 3 Pages.
Thurrot, Paul, "OneDrive Tip: Use Documents and Other Libraries with OneDrive", Retrieved From: https://www.thurrott.com/cloud/microsoft-consumer-services/onedrive/1646/onedrive-tip-use-documents-and-other-libraries-with-onedrive, Feb. 28, 2015, 9 pages.
"Non Final Office Action Issued in U.S. Appl. No. 15/271,199", Mailed Date: Oct. 7, 2019, 16 Pages.
"Final Office Action Issued in U.S. Appl. No. 15/271,185", Mailed Date: Jul. 22, 2019, 16 Pages.
"Notice of Allowance Issued in U.S. Appl. No. 15/271,185", Mailed Date: Dec. 12, 2019, 10 Pages.
"Final Office Action Issued in U.S. Appl. No. 15/271,199", Mailed Date: Jun. 2, 2020, 18 Pages.
"Non Final Office Action Issued in U.S. Appl. No. 15/271,199", Mailed Date: Oct. 8, 2020, 16 Pages.
"Office Action Issued in European Patent Application No. 17777446.0", Mailed Date: Jan. 27, 2021, 8 Pages.
"Final Office Action Issued in U.S. Appl. No. 15/271,199", Mailed Date : May 3, 2021, 18 Pages.
"Office Action Issued in Indian Patent Application No. 201947008341", Mailed Date: Jul. 13, 2021, 7 Pages.
"Second Office Action Issued in Chinese Patent Application No. 201780048475.X", Mailed Date: May 25, 2023, 8 Pages.
"Notice of Allowance Issued in Chinese Patent Application No. 201780048475.X", Mailed Date: Jul. 28, 2023, 4 Pages.
"Non Final Office Action Issued in U.S. Appl. No. 17/724,089", Mailed Date: Apr. 14, 2023, 16 Pages.
"Decision to Grant Issued in European Patent Application No. 17749271.7", Mailed Date: Sep. 15, 2022, 2 Pages.
"Notice of Allowance Issued in European Patent Application No. 17749271.7", Mailed Date: Jun. 15, 2022, 6 Pages.
"Decision to Grant Issued in European Patent Application No. 17777446.0", Mailed Date: May 27, 2022, 2 Pages.
"First Office Action and Search Report Issued in Chinese Patent Application No. 201780048475.X", Mailed Date: Nov. 28, 2022, 8 Pages.
"First Office Action and Search Report Issued in Chinese Patent Application No. 201780057877.6", Mailed Date: Sep. 9, 2022, 22 Pages.
"Notice of Allowance Issued in Chinese Patent Application No. 201780057877.6", Mailed Date: Feb. 25, 2023, 4 Pages.
"Notice of Allowance Issued in European Patent Application No. 17777446.0", Mailed Date: May 27, 2022, 2 Pages.
"Notice of Allowance Issued in European Patent Application No. 17777446.0" Mailed Date: Mar. 2, 2022, 7 Pages.
"Office Action Issued in European Patent Application No. 17749271.7", Mailed Date: Dec. 15, 2021, 8 Pages.
Final Office Action mailed on Dec. 26, 2023, in U.S. Appl. No. 17/724,089, 13 pages.
Non-Final Office Action mailed on Jun. 20, 2024, in U.S. Appl. No. 17/724,089, 15 pages.

\* cited by examiner
† cited by third party

SYMBOLIC LINK BASED PLACEHOLDERS

BACKGROUND

Placeholders are a synchronization engine feature that provides a means in situations like when a user wants to synchronize more content than they may have disk space for, when the user wants to allocate space for other things, policy, and so on. Instead of synchronizing an entire file, a small "placeholder" file may be synchronized instead. When the user interacts with the file, the synchronization engine may download (or "hydrate") the contents to disk just in time. The effect is that the user may see their entire namespace, regardless of disk space, and can interact with their files as normal, as long as they are online. One aspect of placeholders is that there is minimal (if any) application compatibility work, as aside from slow opens and reads, applications are largely unaware that files are hydrated just-in-time.

In some operating systems such as Windows® operating systems by MICROSOFT CORP. of Redmond, WA, a mini-filter driver system may be provided that allows third parties to inject code between the file system and the user mode file system application programming interface (API). This may provide the means to intercept file open, read, and write requests, hand them off to the synchronization engine, allow the synchronization engine to download the file, and fulfill the original open, read, or write request. Other operating systems may not support any type of filter driver or stackable file systems making injection of code in-between the file system and user mode file APIs difficult. Conventional implementations are essentially a binary one: either implement a file system from scratch, or implement a superficial system that requires a substantial amount of application compatibility work.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing symbolic link based placeholders for cloud stored data synchronization. In some examples, a path to a target file may be determined from a symbolic link, which points bi-directionally to a placeholder virtual file system (VFS). A path to a source file may also be determined from the symbolic link, and the symbolic link deleted to avoid confusion in subsequent requests. Content of the source file may be copied to the target file and the path to the target file may be copied to a buffer to be returned to a kernel of an operating system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
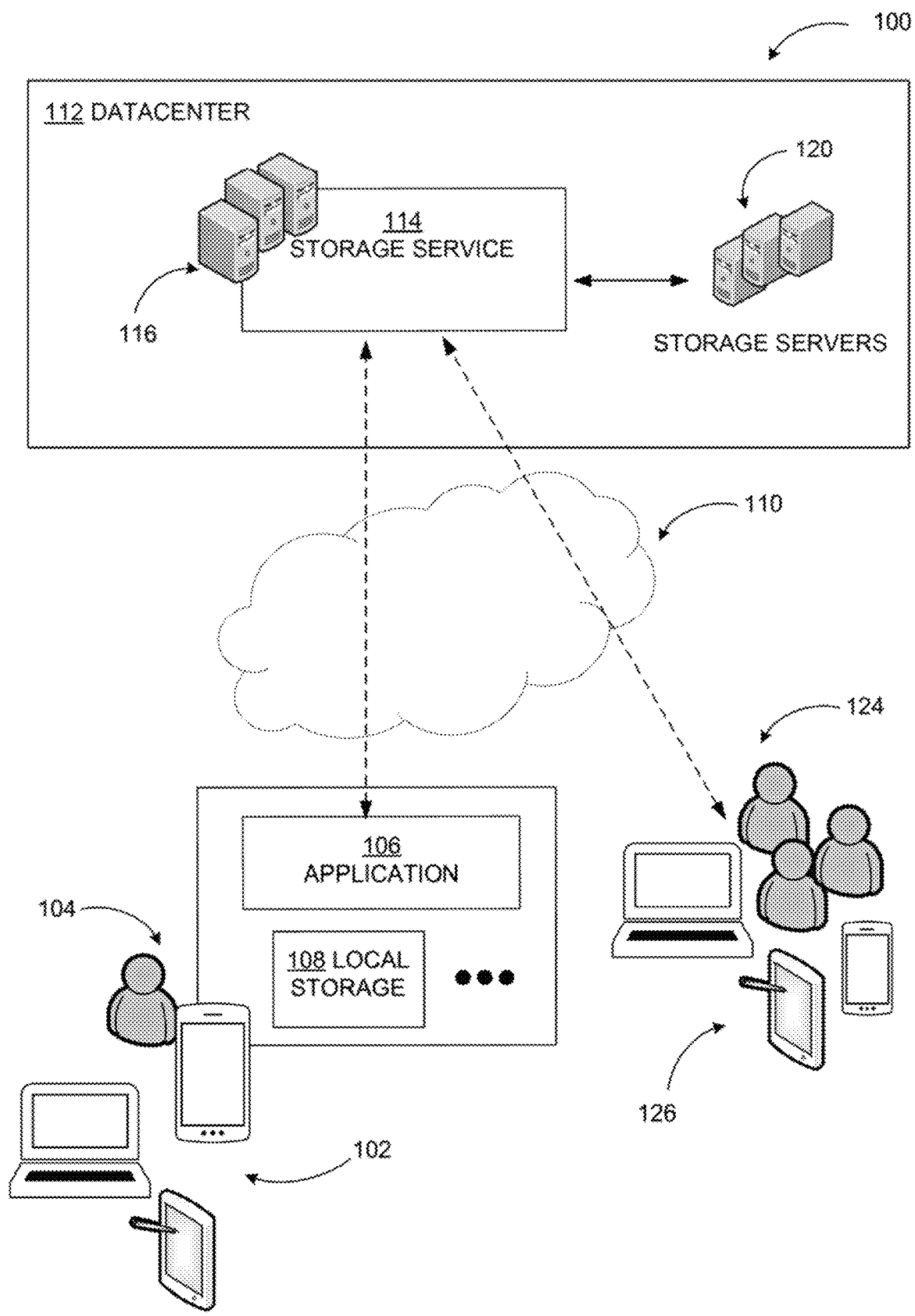
FIG. 1 includes an example network environment where a system to provide cloud storage with symbolic link based placeholders may be implemented.

As briefly described above, embodiments are directed to providing symbolic link based placeholders. To synchronize cloud stored data, placeholders may be implemented as symbolic links to a location that has a custom virtual file system (VFS) mounted. When a symbolic link is opened, the operating system may be directed to the custom VFS. The custom VFS may hydrate the file through a synchronization engine, and place the hydrated file at the location of the original symbolic link. The custom VFS may then redirect back to the primary file system of the operating system (e.g., OSSFS system) to allow the operation on the file to complete. Complexity and resource consumption may be reduced by passing placeholder requests instead of all requests through the custom VFS.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing bidirectional symbolic link based placeholders. Bi-directional, as used herein, refers to capable of providing communication in both directions (e.g., from an operating system specific file system to a placeholder file system and vice versa). Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to provide cloud storage with symbolic link based placeholders may be implemented.

Some operating systems support file system extensibility via a virtual file system (VFS) kernel programming interface (KPI). The VFS system is designed to abstract the details of file systems from the rest of the system as a whole, in order to support file system extensibility. VFS implementations may be provided by the operating system, or built into a kernel extension. The core KPI for both first and third party systems may be the same, but there may be differences in terms of which functions are exported out of the kernel for third party systems.

File systems are mounted on a path. For example, MyCoolFS may be mounted on ~/Foo/Bar. Any files contained within the path ~/Foo/Bar may be handled by MyCoolFS, whereas files at ~/Foo may be handled by the default file system (e.g., hierarchical file system "OSSFS"). As mentioned above, VFS is designed to abstract the details of how files are accessed and stored from the rest of the system. To kernel-space or user-space, the VFS presents an interface that deals in terms of paths and file handles. Internally, VFS may maintain significant state, and read and write blocks on disk in any way it sees fit. VFS implementations may also abstract network file systems, devices, processes, and more.

Implementation-wise, a VFS may be considered a table of function pointers that implement various operations. There are two classes of operations. VFSOPs operate on the entire file system as a whole. Example VFSOPs include things like mount, unmount, find the root, and so forth. VNOPs operate on individual files or directories. Example VNOPs include lookup, open, read, write, etc.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to manage the storage service 114, where data from devices (such as devices 122, 126) may be synchronized with the cloud stored data at storage servers 120 (or associated data stores). As described herein, the storage service 114 may be implemented as software, hardware, or combinations thereof.

In some embodiments, the storage service 114 may be configured to interoperate with various applications to synchronize files stored locally on user associated devices with the same files stored remotely at the storage service 114. For example, as illustrated in the diagram 100, a user 104 may execute a thin (e.g., a web browser) or a thick (e.g., a locally installed client application) version of an application 106 through the device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the storage service 114 may be configured to receive content stored on local storage 108 of the device 102. The received content may be stored remotely at the storage service 114 within the storage servers 120, for example. Periodic synchronization between the content stored on local storage 108 of the device 102 and the content stored remotely at the storage service 114 may be performed to ensure a most updated version of the content is stored and/or shared at each location.

Conventionally, some cloud-based storage services and/or providers may offer a selective synchronization functionality, which enables users the ability to select which content to synchronize up to the storage service or down to the device. While some operating systems may provide the infrastructure to synchronize data with cloud storage seamlessly and allow operations on synchronized files, other operating systems may not have the infrastructure to provide the seamless operation. Thus, users may have to deal with complex systems or not be able to take advantage of advanced features of cloud storage. A system according to embodiments allows users to use cloud synchronization in operating systems without the necessary infrastructure through symbolic link based placeholders. Users may be able to operate on files as if they are locally available, take advantage of increased efficiency, reduce local computing resource usage, and take advantage of increased security and collaboration features of cloud storage.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
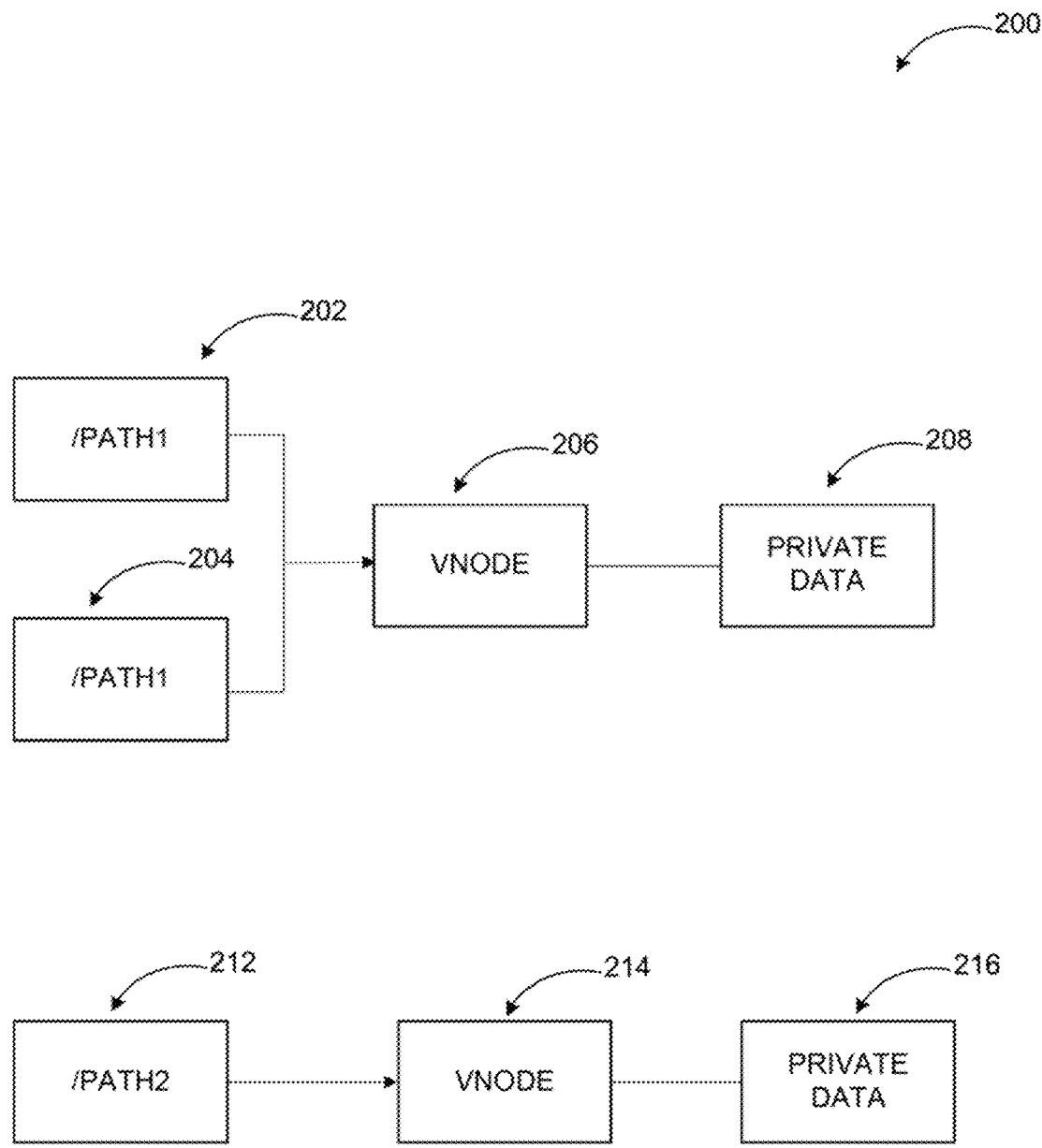
FIG. 2 illustrates a diagram of how operating system objects associated with VFS related to each other.

FIG. 2 illustrates a diagram of how operating system objects associated with VFS related to each other.

Internally, file systems deal with structures such as blocks and i-nodes. In VFS, these details may be hidden from the rest of the kernel and instead the operating system may deal with a VFS in following terms. Path (212): paths are of a fixed standard format and look like /directory1/directory2/file.txt, for example. Paths 202, 204 may also have modifiers to specify a fork of the file (an alternate data stream). Vnode (206, 214): to operate on the file system, the kernel may first acquire a vnode. A vnode is essentially a kernel representation of a file handle. To obtain a vnode, the kernel may exchange a path for a vnode with the VFS in an operation called VNOP_LOOKUP. The vnode is an abstract representation of the file and contains a number of metadata fields visible to the kernel, but to a VFS, the vnode may be an opaque structure. private data (208, 216): file systems need to associate some type of data with each file. This is the purpose of the private data. Each vnode may have a structure that points to a VFS-allocated block of memory for the private data. The VFS may define this structure arbitrarily. The kernel provides methods for getting and setting this private data on each vnode.

In some systems, there may be a 1:1 relationship between vnode 206 and private data 208. Each vnode may be associated with one and only one private data, and vice versa. There is a many:1 relationship between path (202, 204) and vnode 206. Two equivalent paths (202, 204) may map to the same vnode 206. Sometimes, alternate names for files, etc. may map to the same vnode too. Vnodes may be converted back to paths.

As mentioned previously, a VFS is expected to implement two classes of operations: VFSOPs, which are operations that act on the entire file system, such as mount and unmount, and VNOPs, which are operations that act on individual vnodes, such as open or read. Both operations may be implemented in the VFS by providing a table of function pointers to the kernel when the VFS is loaded.

VFSOPs and VNOPs need to be fully thread-safe, as the kernel may call into any of these functions at any time, from any thread. The VFSOPs operate on the entire file system. VNOPs, however, operate on individual vnodes and may have complex state management. Obtaining a vnode is a pre-requisite for calling most VNOPs, and as modes may need to be cleaned up when they are done being used.

The operation for obtaining a vnode is called in some operating systems VNOP_LOOKUP. Embodiments, as mentioned before are not limited to specific operating system. Thus, some operating system specific terms may be used herein for illustration purposes, but embodiments may be implemented using any module, command, and components using the principles described herein. The VNOP is provided a path, and the VFS is expected to return a vnode that represents the path. The VFS is required to return one vnode for a given path, so if there is already a vnode for the path, the VFS is expected to produce it. This means that VNOP_LOOKUP may need to implement a caching mechanism that associates paths with vnodes, and may need to synchronize the cache to protect against re-entrancy.

VNOP_LOOKUP is expected to behave as follows: (1) Determine if a vnode exists for the path provided. If so, return it. (2) Otherwise: (A) Create a new private data node and set any properties needed on it; (B) Create a new vnode and associate it with the private data; and (C) Return this vnode.

As noted above, this behavior demands that the VFS maintain a cache of some type so that it may be determined if a vnode already exists for a path. Example implementations may provide a reasonably robust cache implementation based on a hash table that uses an extra structure called an HNode, which is basically an object to point to the vnode and private data. In an example implementation, functions may be provided to create vnodes and private data in pairs, as well as get private data from a vnode or vice versa.

Once lookup has returned a vnode, it may be used for most of the other VNOPs. For example, to open and read a file, the following sequence may occur:
  1. VNOP_LOOKUP is called to get a vnode for the given path.
  2. VNOP_OPEN is called
  3. VNOP_READ is called one or more times
  4. VNOP_CLOSE is called
  5. VNOP_RECLAIM is called Once the vnode's refcount falls to zero, the kernel may reclaim the vnode at any time by calling VNOP_RECLAIM. The VNOP is expected to discard the memory created for the private data, along with any associated hash table entries, in preparation for the system destroying the vnode. In some operating systems, the VFS itself may not destroy the vnode. Rather, the VFS may detach the vnode from its cache and clean up the private data associated with the vnode. The kernel may then destroy the vnode after the VFS has finished cleaning these structures.

A special case of VNOP_LOOKUP is VFSOP_ROOT, in which the root vnode is obtained. This is a VFSOP and so acts on the entire file system, but the implementation is relatively similar to VNOP_LOOKUP minus the path to vnode conversion. In a typical implementation, the root vnode has a special hardcoded cache key, and the vnode is simply looked up from the cache.

Figure 3A:
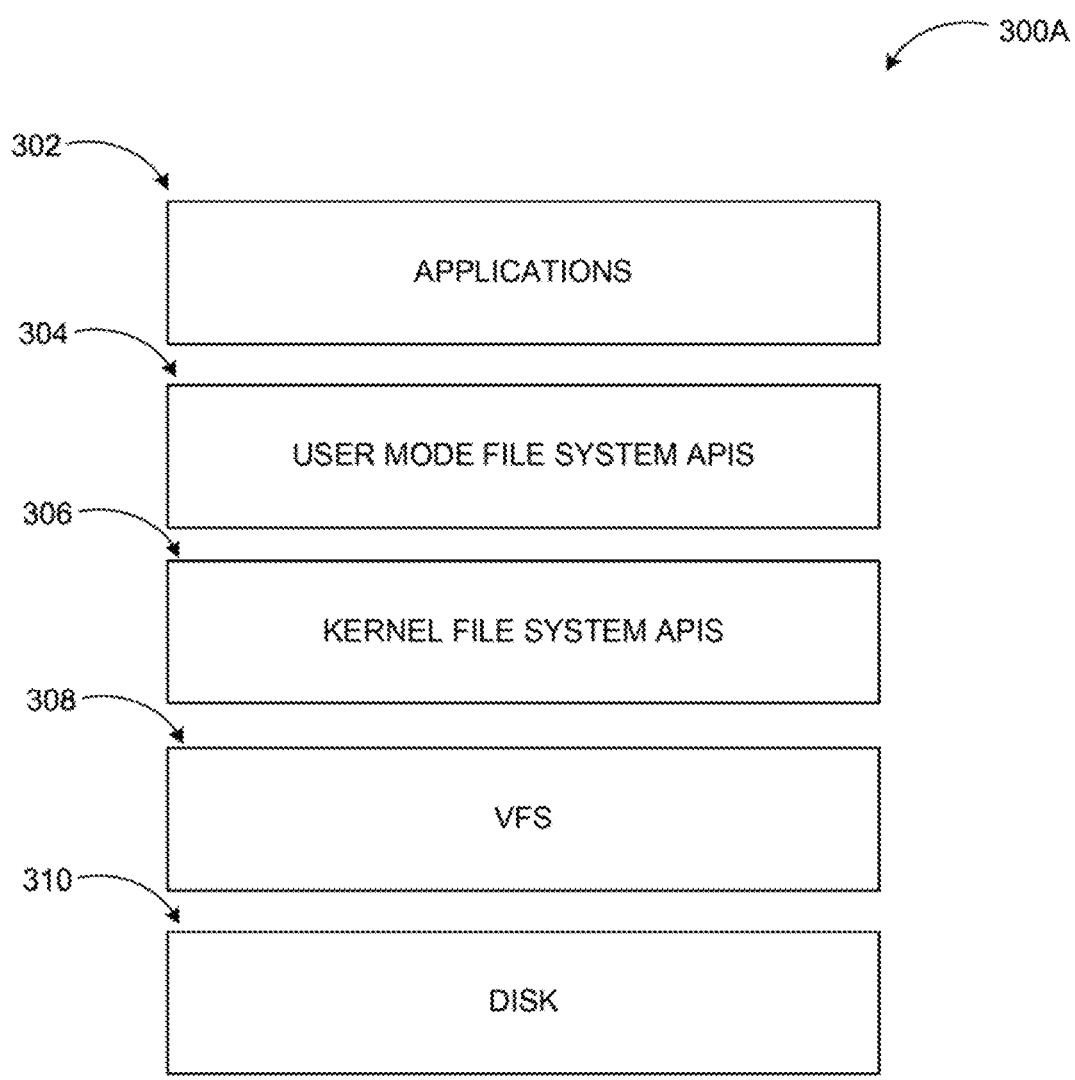
FIGS. 3A-B include an example stack of an operating system such as Windows® operating systems by MICROSOFT CORP. of Redmond, WA, and placeholder code's placement in the stack.
Figure 3B:
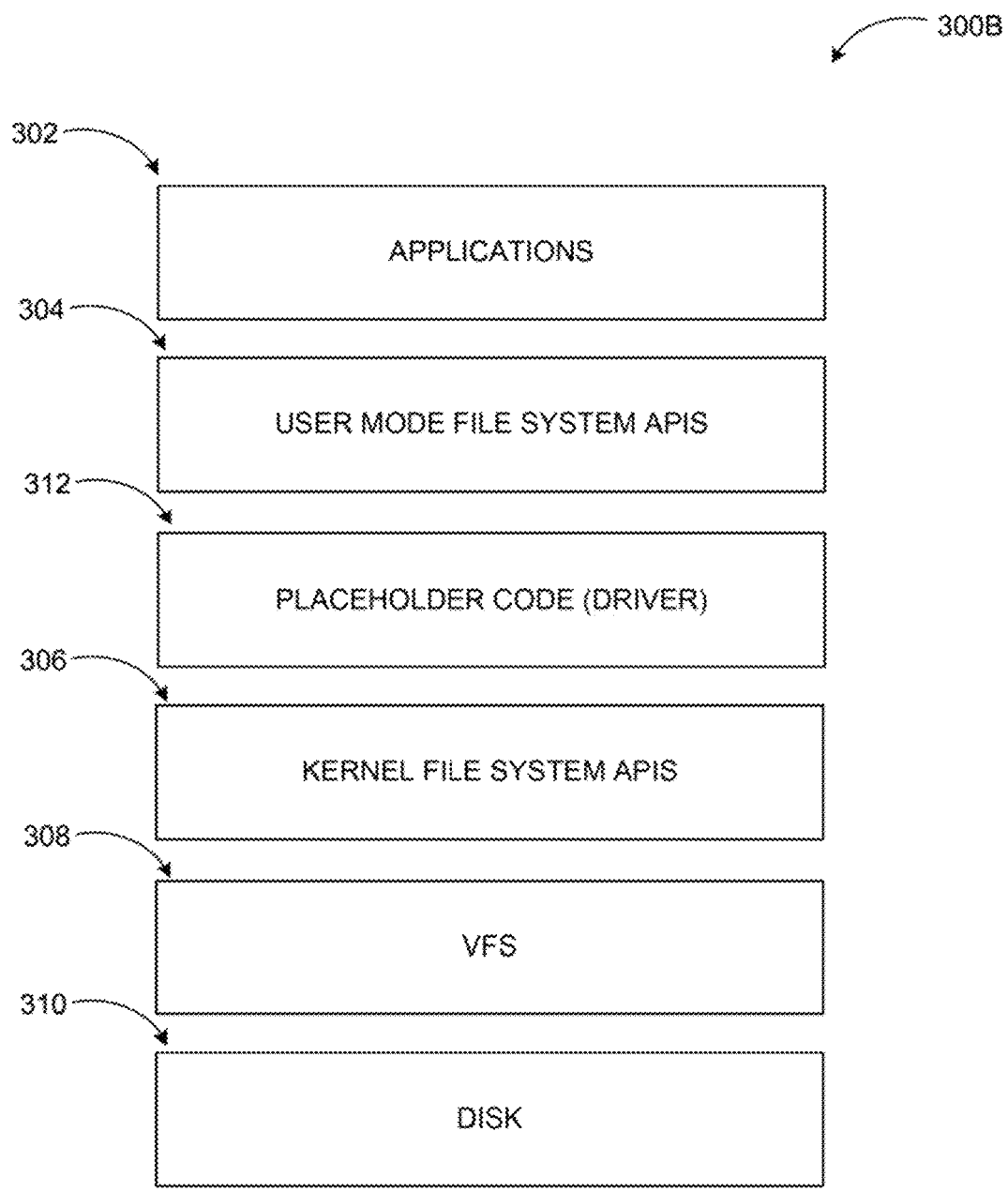

FIGS. 3A-B include an example stack of an operating system such as Windows® operating systems by MICROSOFT CORP. of Redmond, WA, and placeholder code's placement in the stack.

As shown in diagram 300A, a typical stack may include applications 302, user mode file system APIs 304, kernel file system APIs 306, VFS 308, and disk 310. Diagram 300B shows how, a mini-filter driver system (placeholder code 312) may be provided between the user mode file system APIs layer 304 and kernel file system APIs layer 306 in an operating system such as Windows® operating systems by MICROSOFT CORP. of Redmond, WA, and allow third parties to inject code between the file system and the user mode file system APIs. This may provide the means to intercept file open, read, and write requests, hand them off to the synchronization engine, allow the synchronization engine to download the file, and fulfill the original open, read, or write request.

Figure 4A:
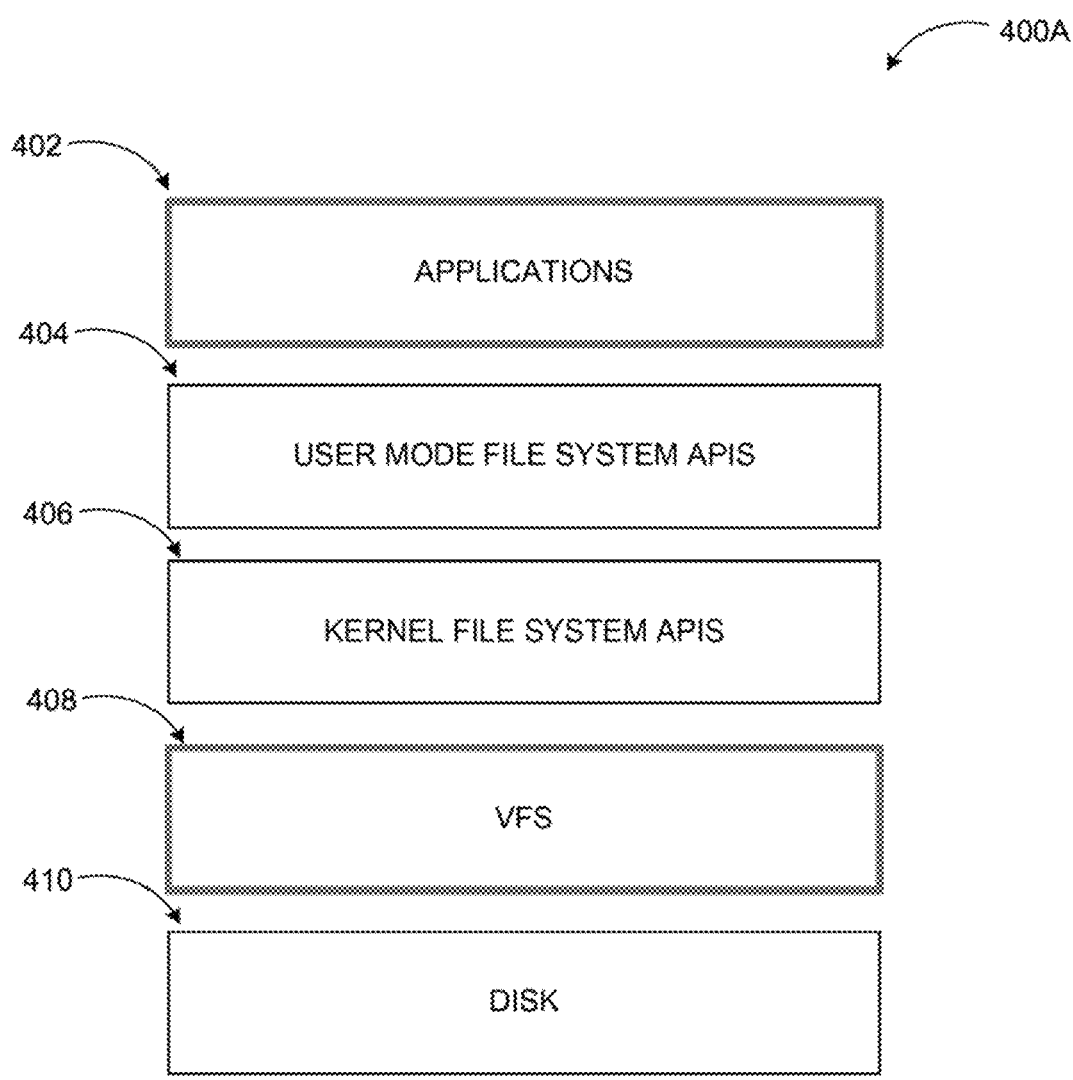
FIGS. 4A-C include potential placement of placeholder code in an example stack of an operating system that does not provide the necessary infrastructure, an example forwarding setup using a custom VFS, and an output of the custom VFS arrangement.
Figure 4B:
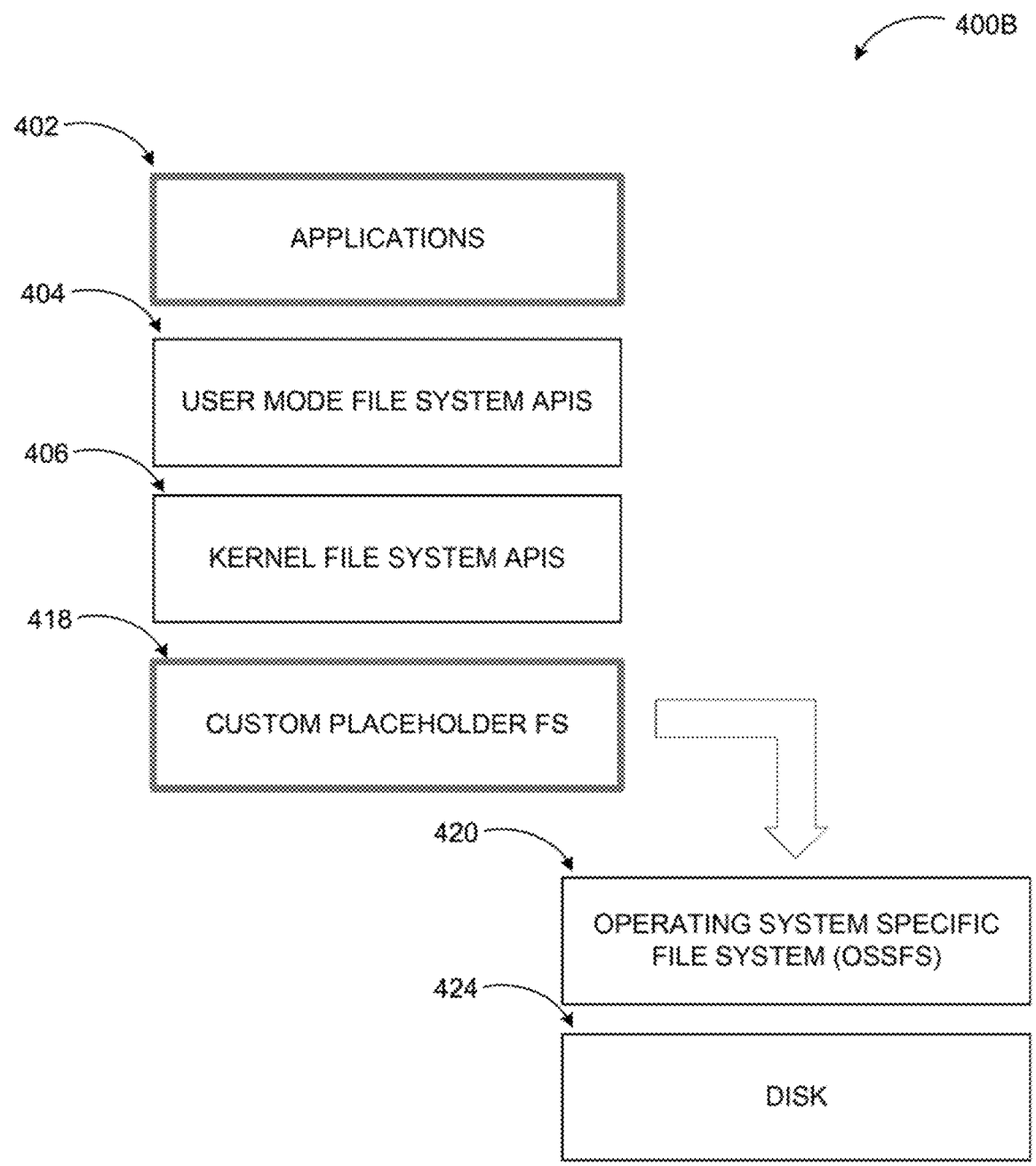
Figure 4C:
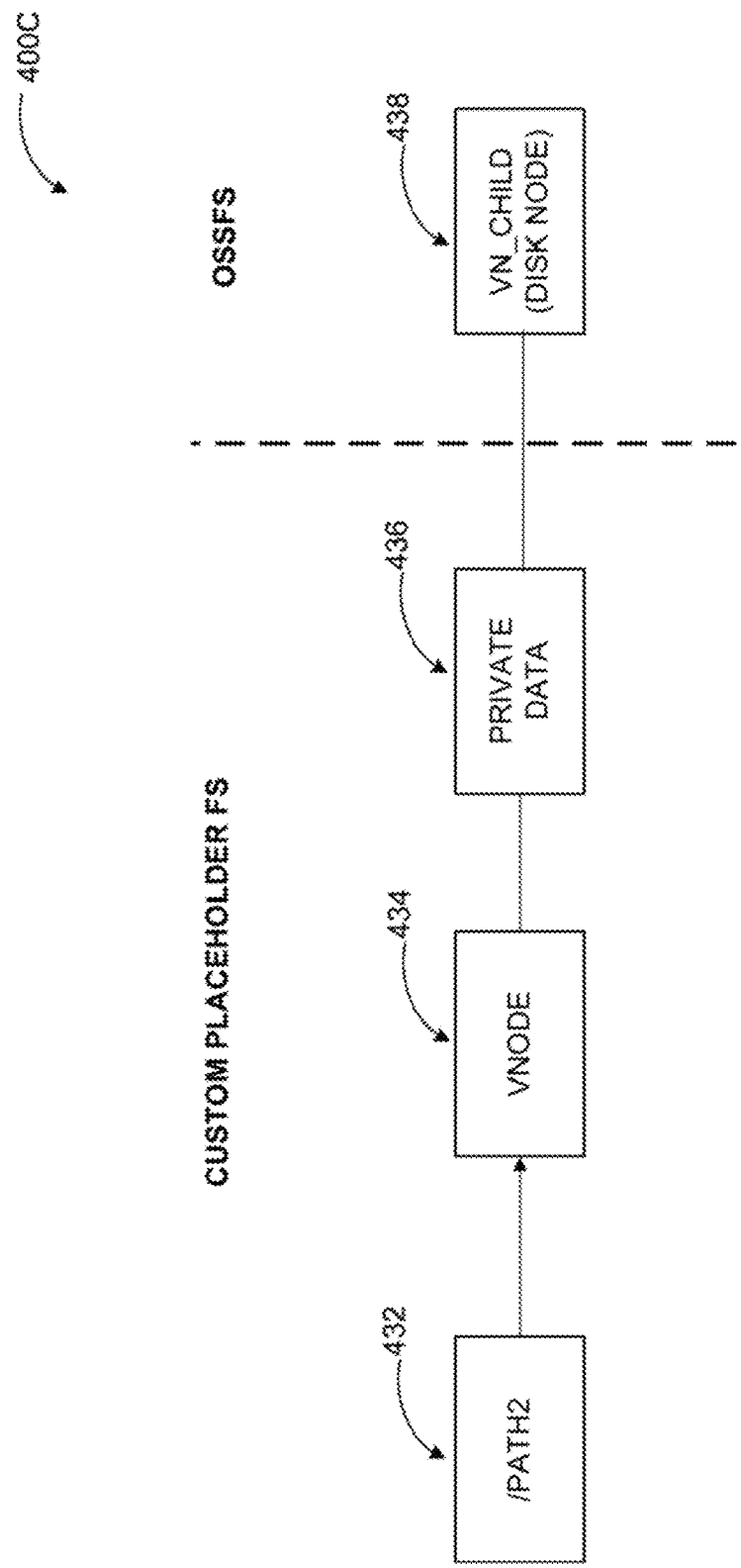

FIGS. 4A-C include potential placement of placeholder code in an example stack of an operating system that does not provide the necessary infrastructure, an example forwarding setup using a custom VFS, and an output of the custom VFS arrangement.

Some operating systems may not allow the placeholder code to be injected between the user mode file system APIs 404 and kernel file system APIs 406. Thus, as shown in diagram 400A, the code may need to be inserted either in the applications layer 402 or the VFS layer 408 above the disk 410.

Inserting this code at the application layer 402 either means modifying every application to be placeholder aware (may not be possible), or creating special ".placeholder"

files that are associated with a hydration application. The user may activate the ".placeholder" file, the hydration application may open and hydrate the file, and then launch the default application associated with the newly hydrated file.

As illustrated in diagram 400B, inserting the custom code at the VFS layer means either replacing operating system specific file system (OSSFS) 420 and storing files in a custom format, or performing some type of forwarding operation to OSSFS 420. The former may be extraordinarily complex. The user's synchronized content may be mounted at the same path as custom placeholder FS 418, which means that the custom placeholder FS 418 sees all file system operations on that content. Because it sees all file system operations, this enables the custom placeholder FS 418 to intercept the ones needed to perform placeholder hydration. This arrangement also obligates the custom placeholder FS 418 to forward nearly all VNOPs to the underlying OSSFS 420 file system, so that the files may actually be read and written on disk 424.

Implementing every VNOP in such a way that they may be forwarded to the underlying file system may be complex. There may be about 40 VNOPs, some of which may have aspects that need to be understood and dealt with by the custom placeholder FS. Otherwise, unexpected and erratic behavior may result.

In some examples, a VNOP_LOOKUP (for a vnode not in the cache) implemented by the custom placeholder VFS may proceed as follows:

1. Forward the VNOP_LOOKUP call to the underlying file system. A vnode is returned.
2. Create a separate vnode to wrap the first vnode.
3. Create private data that holds a reference to the vnode obtained in step 1, and attach the private data to the vnode created in step 2.
4. Return the vnode created in step 2.

Diagram 400C illustrates an output of the above process. On every subsequent VNOP, the vnode 434 (from path2 432) presented to the VNOP is the vnode created by the custom placeholder VFS 418. The VFS needs to unpack the underlying disk vnode from the private data 436, and forward this call onto OSSFS. Although for some VNOPs this may be relatively trivial, for many it may be quite complex, particularly when a OSSFS vnode may be created as part of the VNOP.

The complexity described above is without considering placeholders. When considering placeholders, further complexity may be introduced. The custom placeholder FS may need to know which files are placeholders so it may intercept the correct VNOPs and hydrate the file before passing it through to OSSFS. In many implementations, this may mean keeping extra state, and may mean cases where vn_child 438 is NULL, which have to be handled.

As noted above, the custom placeholder FS may need to know which files are placeholders and which are not. Placeholders need special hydration handling before certain types of VNOPs. Discovering which files are placeholders may involve high usage of computing resources. One approach for doing this is to store some special data in the file (or a fork of the file), and read it to determine whether the file is a placeholder. However, this resource-expensive I/O operation may be needed constantly, and needed even when the file is no longer a placeholder. For example, considering a file that starts as a placeholder, during VNOP_LOOKUP, the custom placeholder FS may read a special block from OSSFS, and determine it is a placeholder. Hydration may occur and the file may be placed on disk as normal, with the special block removed. During a subsequent read to the file, after the file has been closed and the vnode destroyed, the custom placeholder FS may need to again determine if this file is a placeholder or not, which may require a subsequent read to the special block, which may fail. Indeed, in the normal case, the special block may not exist (since most files are not placeholders), which may result in a substantial amount of wasteful disk I/O.

Another approach to annotating which files are placeholders may be to have the VFS keep a state, either short or long-term. In a short-term scenario, the synchronization engine may need to imbue the state into the VFS each time it starts up, and of course the VFS may have to have a place to store that. In some examples, the VFS may be mounted on a disk image that may be filled with state information about placeholders. However, there may be other ways to store the state information as well. In either scenario, state needs to be synchronized between the VFS, OSSFS, and the synchronization engine. To maintain state between the synchronization engine and disk may be a substantial challenge and adding a third partner (VFS) to that mix may increase the complexity by a substantial amount.

Yet another approach to determining which files are placeholders is to have the VFS ask the synchronization engine. This may involve crossing the kernel→user space boundary frequently, which may be essentially a File System in User Space (FUSE) model. FUSE is a file system implemented in user space, primarily for programmer ease. One of the many challenges with FUSE is that every file system operation has to cross the kernel→user space boundary, which may be resource-expensive, and given the frequency with which file system operations occur, even prohibitively so. Even in a custom-designed placeholder VFS that crosses the boundary only once per vnode, doing this lookup may utilize too many computing resources. This may be especially true because by default most files may not be placeholders.

A further approach to determining which files are placeholders is to annotate this fact in the file's MFT entry, essentially the vnode_attrs for the file. It may involve far fewer resources to read data from the MFT than from disk. A placeholder hint may be encoded in the vnode_attrs and persisted into OSSFS. Such a hint may be an explicit value (e.g. size=31337=placeholder), or may be a stenography-like set of values spread across multiple properties (e.g. size and timestamp high order bits are all 1's). Such an approach may be not reliable, however. Because the VFS does not completely control the OSSFS location (i.e., the file on disk can be modified by some other external actor), these attributes may change without the VFS being involved, and be invalidated.

One more challenge with the forwarding approach may be directory confusion. Returning to FIG. 4B, the arrangement of components may require the user to interact with their synchronized content in one directory, but it is actually stored in a different directory. For example, the custom placeholder VFS might be mounted at ~/clouddrive, but their content may be actually stored and synchronized in ~/.clouddrive-private. This arrangement may have several consequences.

First, the user may need to transition to this state, from a state where their content is stored in ~/clouddrive. The transition is a step that may fail as part of setup. Second, the transition is a binary choice. If the user wants placeholders, they need to go through this transition. If they do not want placeholders, they either have to go back, or use the placeholder code for no real benefit. Third, this arrangement may leave open the possibility that another application may modify the private ~/.clouddrive-private directory while the system is mounted. As described above, this may introduce additional complexity.

Figure 5:
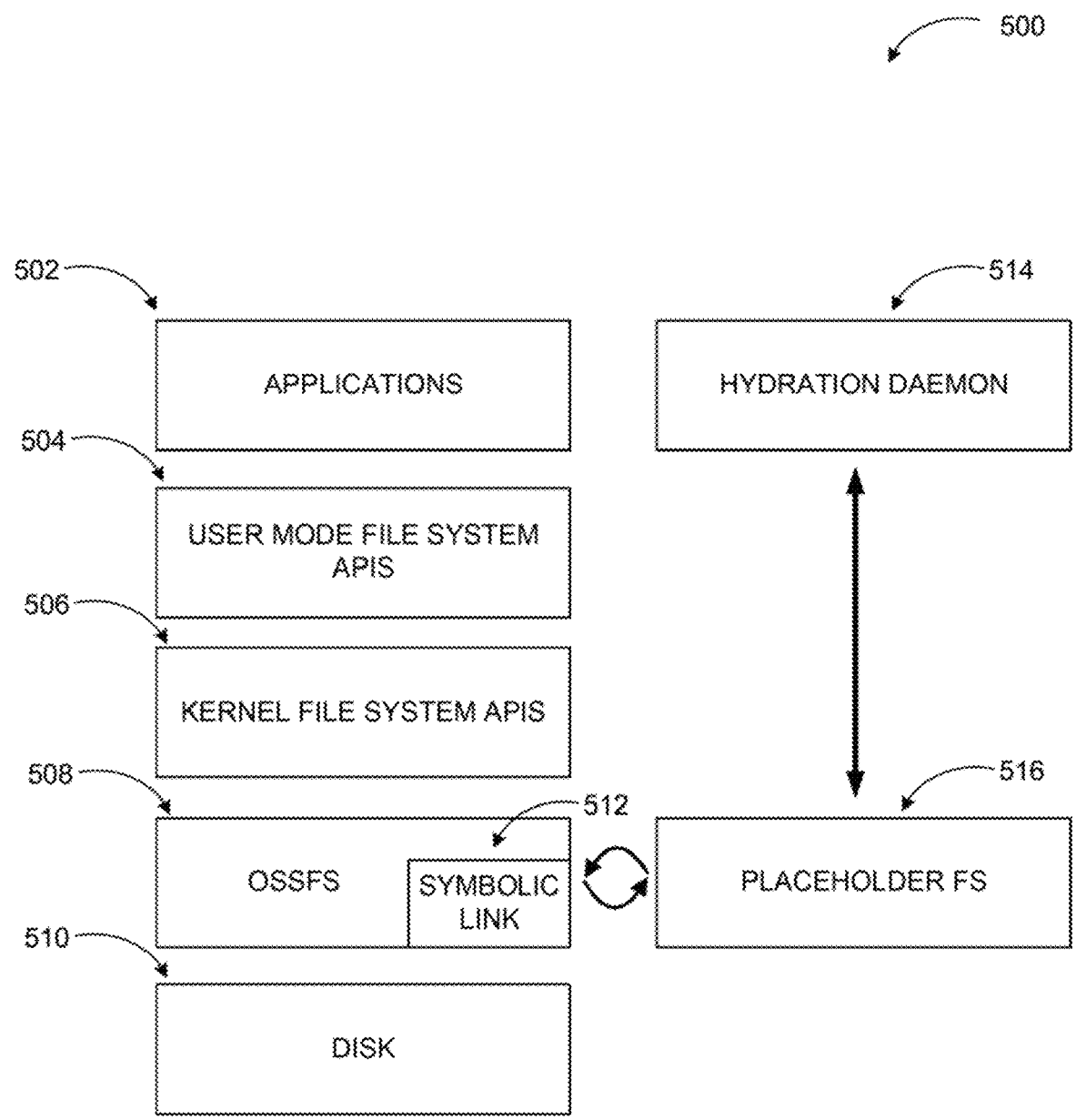
FIG. 5 includes an illustration of a stack with a symbolic link according to some embodiments.

FIG. 5 includes an illustration of a stack with a bidirectional symbolic link according to some embodiments.

The symbolic link based placeholders according to some embodiments may address the challenges of a full file system implementation. Some aspects of an example implementation may include scoping to situations involving placeholders (not the entire file system), reduced complexity, fast and pay-for-play performance, easy configuration/install/uninstall, and no need for state by the VFS.

Symbolic link is the nickname for a file that includes a reference to another file or directory in the form of an absolute or relative path and that affects pathname resolution. A symbolic link may contain a text string that is automatically interpreted and followed by the operating system as a path to another file or directory. The symbolic link is a second file that exists independently of its target. If a symbolic link is deleted, its target remains unaffected. If a symbolic link points to a target, and sometime later that target is moved, renamed or deleted, the symbolic link is not automatically updated or deleted, but continues to exist and still points to the old target, now a non-existing location or file. Symbolic links are different from hard links. Hard links do not link paths on different volumes or file systems, whereas symbolic links may point to any file or directory irrespective of the volumes on which the link and target reside. Hard links refer to an existing file, whereas symbolic links may contain an arbitrary path that does not point to anything.

As shown in diagram 500, the custom placeholder FS (OSSFS 508) may be placed in the stack between the disk 510 and kernel file system APIs 506 with applications 502 and user mode file system APIs 504 above the kernel file system APIs 506. In some examples, placeholders may be implemented as symbolic links to a location that has a custom placeholder FS mounted. When a symbolic link 512 is opened, the system may follow it and arrive at the custom placeholder FS 516. That custom placeholder FS 516 then has the opportunity to hydrate the file, and place the hydrated file at the location of the original symbolic link 512. The custom placeholder FS 516 may then redirect back (the second redirect) to the OSSFS 508 to allow the VNOP to complete. An optional user mode daemon (hydration daemon 514) may actually perform the hydration process. Instead of passing all requests through the custom placeholder FS 516, a system according to embodiments may forward only placeholders (symbolic links). This may allow the custom placeholder FS 516 to dramatically reduce its scope and complexity, as it is only dealing with placeholders.

A synchronization engine is responsible for laying out content in the synchronized folder as it sees fit, including deciding which files are placeholders, and creating placeholders as necessary. In one example implementation, symbolic links that represent placeholders may have a link that obeys the following format "~/.placeholderfsmountpoint/p###_metadata", where ### is the entity ID (or resource ID) for the file being represented as a placeholder, and metadata is a metadata string that describes some key properties about the file. For example, the properties include the name and size of the file. The entity ID may simply provide a means for the VFS to know which file is being used. The metadata blob may play a role in some operations, specifically VNOP_GETATTR, that need to be able to return accurate information about the placeholder before it is hydrated. Other types of symbolic links that do not point to the placeholder FS location may exist in the synchronization folder without interfering with the operation of the placeholder system. The formats and properties discussed above are intended as illustrative examples only and do not constitute a limitation on embodiments.

The custom placeholder FS may be a custom VFS implemented on top of a mount point such as "~/.placeholderfsmountpoint". The files represented by the placeholder VFS are not real files on disk. They are abstractions of files in the cloud. Further, the files contained within the VFS may not be known to the VFS, and state information about the files may be passed into the VFS by way of VNOP_LOOKUP's path component. This may be the only state kept by the VFS, which is to say it may not maintain any state, except on a transient basis. For example, a placeholder for entity ID 101, named "a.txt" may look like this to VNOP_LOOKUP: ~/.placeholderfsmountpoint/p101_a.txt. When this path is presented to VNOP_LOOKUP, placeholder FS 516 creates a vnode that represents an entity with ID 101, and metadata that contains a filename of "a.txt". Placeholder FS 516 may keep no other state, so it may not know whether this entity actually exists, or where the data is. For these and other functions, placeholder FS 516 may rely on the hydration daemon 518. In other examples, the kernel may hydrate itself too. The VFS may be implemented as a loadable KEXT (kernel extension) or built in the operating system.

The VNOP_LOOKUP implemented by the custom placeholder FS may connect custom placeholder FS 516 to the synchronization engine. A component name parameter passed to this VNOP may contain the path string that is requested relative to the root of the file system. This implementation may achieve the following:

1. Determines if the component name is invalid. In the example, the format begins with a lowercase "p" so any path names not conforming to this get EINVAL returned.
2. Parses apart the path string. For example, the entity ID and name may be parsed out of the path name.
   a. If one or more are not present, ENOENT (or other error code) may be returned.
   b. If a bad entity ID is provided, ENOENT (or other error code) is returned.
   c. In a real example, the metadata may probably include the size, for reasons described below with VNOP_GETATTR.
3. Creates private data and vnode for the requested file, if one does not already exist.
4. Returns the vnode to the caller The VNOP_GETATTR may be called by the operating system in a variety of situations to discover attributes about a vnode. If the VNOP_GETATTR is called on the root vnode, a set of hardcoded values may be returned. If the VNOP_GETATTR is called on a placeholder, any number of file related attributes may be returned.

The VNOP_OPEN may contain an open mode that tells the file system whether the file is being opened for read, write, or both, among other things.

The VNOP_READ may be called to read content from the file, and together with VNOP_WRITE may be the trigger that activates hydration. VNOP_READ may have two steps: (1) Determine if the file has already been hydrated, if not, hydrate it; and (2) Forward the read call on to OSSFS.

In an example situation, where a file is opened and read several times, before being closed. The sequence of calls might look something like this: Lookup, open, read, read, read, close, reclaim. In the example situation, there is only one lookup. Even for symbolic links, the lookup may occur on the placeholder FS, and after the file is hydrated may not occur again unless the application closes and reopens the file (in which case the lookup may happen on OSSFS). Because of this, multiple read calls may come in for a file, including after the file has been hydrated.

The operation of VNOP_READ may thus be as follows: (1) Determine if this placeholder has already been hydrated; (2) If not, hydrate it; and (3) Forward the call on to OSSFS. Following is an example code for VNOP_READ:

```
errno_t HandleVNOPRead(args)
{
    // The arguments include a vnode, among other parameters
    vp              = args->vnode;
    if (fsn has no child vnode)
    {
        err = HydratePlaceholder(fsn);
    }
    if (err == 0)
    {
        if (fsn has a child vnode)
        {
            err = forward VNOP_READ to fsn's child vnode;
        }
        else
        {
            // This state is unexpected as we should have hydrated
            above
        }
    }
    return err;
}
errno_t VNOPRead(struct vnop_read_args *ap)
{
    int                 err = 0;
    vnode_t             vp;
    uio_t               uio;
    int                 ioflag;
    vfs_context_t       context;
    PlaceholderFSMount*             mtmp;
    private data*                   fsn = NULL;
    // Unpack arguments
    vp          = ap->a_vp;
    uio         = ap->a_uio;
    ioflag      = ap->a_ioflag;
    context     = ap->a_context;
    // Pre-conditions
    assert(ValidVNode(vp));
    assert(uio != NULL);
    AssertKnownFlags(ioflag, IO___NDELAY | IO_SYNC |
IO_APPEND | IO_UNIT | IO_NODELOCKED);
    assert(context != NULL);
    {
        return EINVAL;
    }
    Log("VNOPRead", "vp=%p entid=%d", vp, fsn->ent_id);
    // if there is no vnode, we need to hydrate
    if (fsn->vn_child == NULLVP)
    {
        // Needs to hydrate
        Log("VNOPRead", "not hydrated, performing hydration
for vp=%p entid=%d", vp, fsn->ent_id);
        err = PlaceholderHydrate(mtmp, fsn context);
    }
    // If we are here, we should have a hydrated placeholder.
    if (err == 0)
    {
        if (fsn->vn_child != NULLVP)
        {
            Log("VNOPRead", "already hydrated, forwarding to
disk for vp=%p entid=%d", vp, fsn->ent_id);
            err = VNOP_READ(fsn->vn_child, uio, ioflag, context);
        }
        else
        {
            Log("VNOPRead", "no disk vn and no hydration,
```

-continued

```
fatal vp=%p entid=%d", vp, fsn->ent_id);
            err = ENOTSUP;
        }
    }
    Log("VNOPRead", "complete for vp=%p entid=%d err=%u",
vp, fsn->ent_id, err);
    return err;
}
```

The VNOP_WRITE may be called when a write occurs to a file. This VNOP may work in essentially the same way as VNOP_READ: (1) Determine if this placeholder has already been hydrated; (2) If not, hydrate it; (3) Forward the call on to OSSFS. Files that are being written need to be hydrated as the placeholder system may not otherwise write back data to the cloud.

In addition to the above described operations, there may be a set of VNOPs that deal with memory mapped I/O and buffered writes. The VFS may decide how to support these, but they may essentially work in the same way as VNOP_READ and VNOP_WRITE, first ensuring the file is hydrated before passing the VNOP off.

Although the VFS is responsible for intercepting appropriate file I/O requests, it does not actually perform hydration. Hydration from the network is a complex process and involves a number of services, which may be better implemented in user mode. Furthermore, the daemon may need to communicate with the synchronization engine's state (and may even be the synchronization engine depending on the design), all of which live in user space.

When the VFS is loaded (e.g., in the KEXT's start function), communication may be stood up so that the VFS may send tasks to the hydration daemon. There may be a variety of mechanisms to achieve this, but may need to be bi-directional and initiated from either the kernel or user mode. In some examples, a socket system that allows the user mode application to send and receive information over a standard socket may be used. Other non-exhaustive examples may include creating a virtual block device that the VFS is mounted on, and having the user mode daemon fopen( ) the device, followed by reads and writes.

Once communication has been established, the KEXT may send hydration requests. The hydration requests may also contain a ticket ID, which may be generated by the KEXT and may be unique to each ticket. The ticket ID may be needed to match up the request to a response. Because the VFS is multithreaded in some examples, multiple requests and responses may be processed at a time. Attaching a unique ticket ID to each request, and requiring that it be returned in the response, may help determine when a particular request is completed. Because the response is serviced asynchronously, notification about completion may be accomplished by keeping a linked list of all returned responses, and scanning the list for a ticket ID that matches the request. If such a response exists, it may be pulled from the list and returned to the caller. Otherwise, a kernel function may be used to wait for a ticket to arrive with our response.

A hydration process may perform the following steps:
1. Determine the path to the target file (where the symbolic link lives). This may be determined because he entity ID and where the synchronized content is mounted are known. The output may be a fully qualified path to the target, which currently contains the symbolic link.

2. Determine the path to the source (cloud) file. This step may include downloading the source file to a temp location, and the temp location may be the source file.
3. Delete the symbolic link to prevent some subsequent file system calls from being confused by the symbolic link and attempt to follow it back to the placeholder FS.
4. Copy the file from source to target replacing the symbolic link with the actual content of the file.
5. Copy the target path out to a buffer that is returned to the kernel.

In some examples, a hydration function may be used in conjunction with VNOP_READ. In execution of the hydration function, a hydration request call may be sent and a vnode_open call may be sent on the full target path. The vnode_open call may perform the bidirectional communication redirecting back to the primary file system of the operating system (e.g., OSSFS system) to allow the operation on the hydrated file to complete. Through this call, a vn_child member of the private data may be filled, so that the VNOP_READ operation may proceed as if the file already existed in local storage. The sequence of events may be as follows:

1. call to the symbolic link
2. OSSFS reads the symbolic link path
3. The kernel determines the symbolic link points to our VFS, calls VNOP_LOOKUP
4. a vnode is returned for the file
5. read request on the vnode
6. VNOP_READ call is invoked, which sends the hydration request to the daemon
7. The daemon deletes the symbolic link and replaces it with the actual content of the file
8. VNOP_READ then reopens the original location of the hydrated file
9. The VNOP_READ is then forwarded onto OSSFS.

The examples provided in FIGS. 1 through 5 are illustrated with specific systems, services, applications, modules, codes, and notifications. Embodiments are not limited to environments according to these examples. Symbolic link based placeholders may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
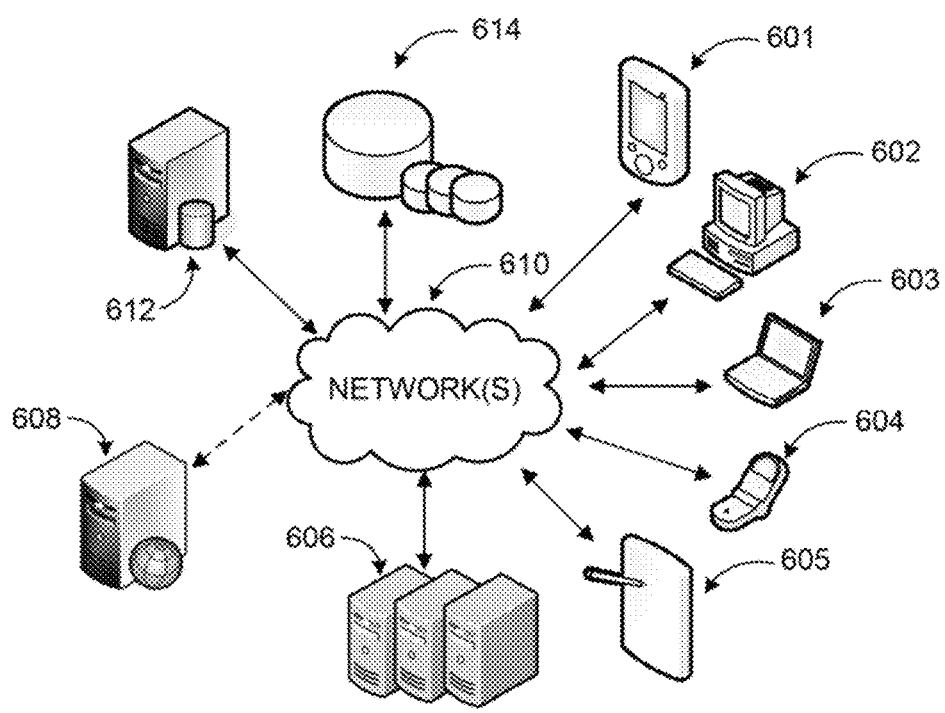
FIG. 6 is a networked environment, where a system according to embodiments may be implemented.

FIG. 6 is a networked environment, where a system according to embodiments may be implemented. In addition to locally installed applications (for example, application 106 or synchronization client 206), a custom VFS and an optional hydration daemon implemented in conjunction with an operating system stack may also be employed in conjunction with hosted applications and services (for example, a storage service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as cloud stored versions of the files may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for symbolic link based placeholders. Furthermore, the networked environments discussed in FIG. 6 are for illustration purposes only. Embodiments are not limited to the example applications, engines, or processes.

Figure 7:
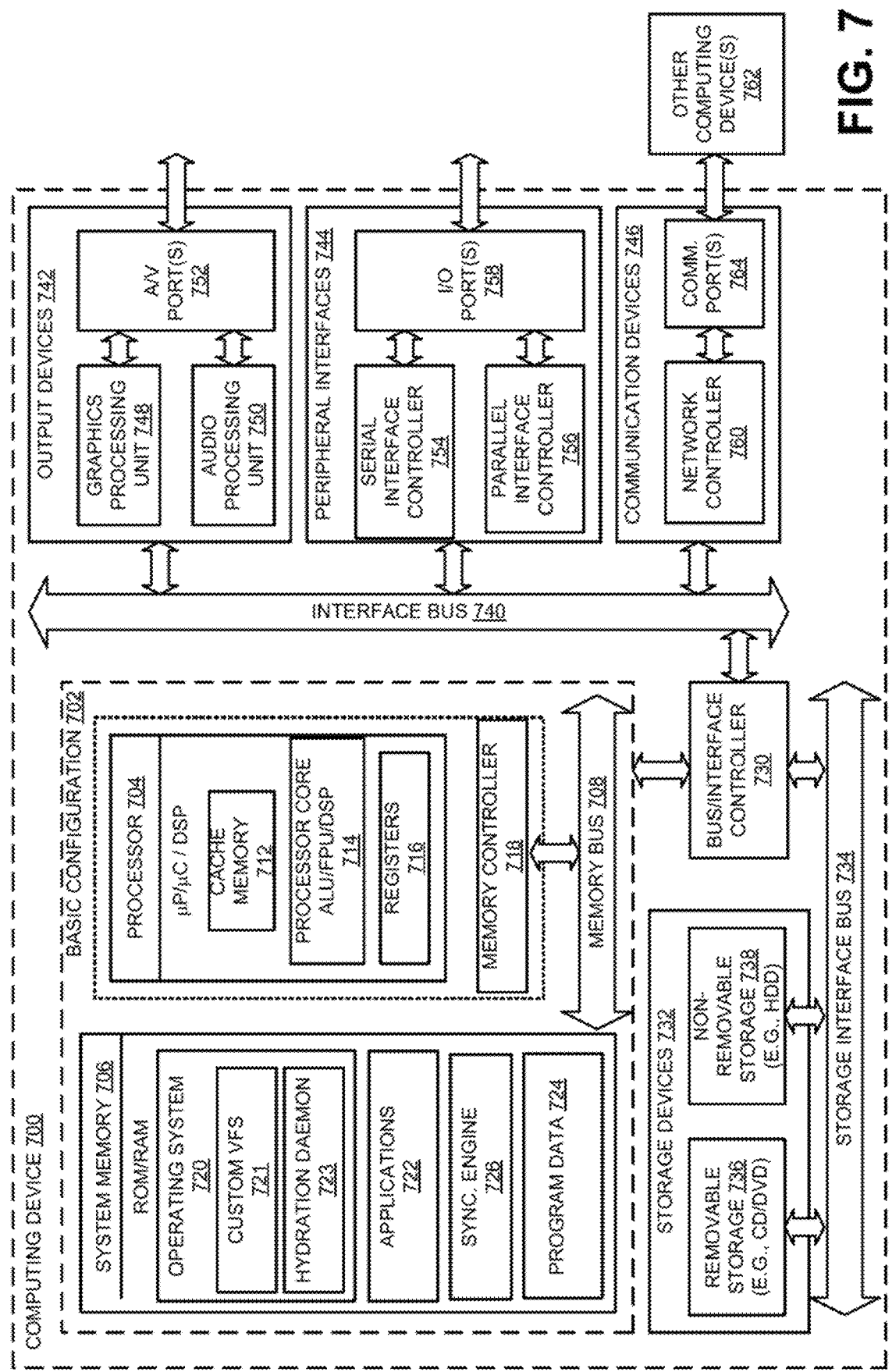
FIG. 7 is a block diagram of an example general purpose computing device, which may be used to provide cloud storage with symbolic link based placeholders.

FIG. 7 is a block diagram of an example general purpose computing device, which may be used to provide symbolic link based placeholders in cloud storage synchronization.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more applications 722, a synchronization engine 726, and program data 724. The synchronization engine 726 may synchronize files between a local storage and a cloud storage. The operating system 720 may include a custom VFS 721 and a hydration daemon 723 to provide symbolic link based placeholders in synchronization of files. The program data 724 may include, among other data, local versions of cloud stored files, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide symbolic link based placeholders. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
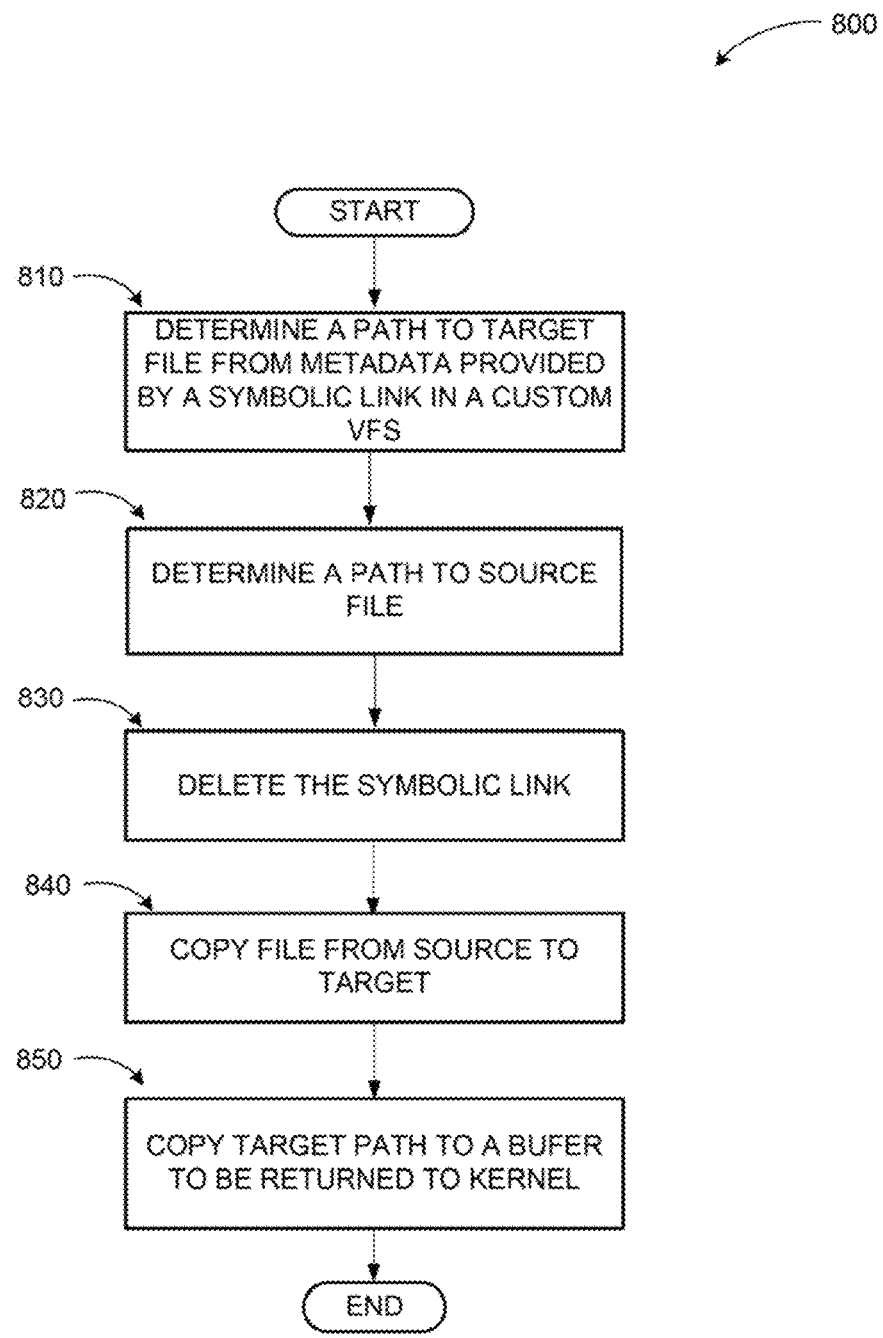
FIG. 8 illustrates a logic flow diagram of a method to provide cloud storage with symbolic link based placeholders.

FIG. 8 illustrates a logic flow diagram of a method to provide symbolic link based placeholders, according to embodiments.

Process 800 may be implemented on a computing device, server, or other system. An example system may include a computer communicatively coupled to a cloud storage server with files synchronized between the computer's local storage and the cloud storage.

Process 800 begins with operation 810, where a hydration daemon may determine a path to a target (requested) file, that is, where the symbolic link resides. The system may know an entity ID associated with the symbolic link and where the synchronized content is mounted. An output of the operation may be a fully qualified path to the target file, which currently contains the symbolic link. At operation 820, a path to the source file may be determined. This operation may include downloading the source file to a temporary location, and the temporary location may be the source file.

At operation 830, the symbolic link may be deleted to prevent subsequent file system calls from being confused by the symbolic link and attempt to follow the link back to the placeholder FS. Deleting the link may not affect the placeholder FS as no callbacks are incurred. At operation 840, the file may be copied from the source to the target effectively replacing the symbolic link with the actual content of the file. At operation 850, the target path may be copied to a buffer to be returned to the kernel.

The operations included in process 800 are for illustration purposes. Providing symbolic link based placeholders may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a method to provide symbolic link based placeholders for cloud stored data synchronization is provided. The method may include determining a path to a target file from a symbolic link directed to a placeholder virtual file system (VFS); determining a path to a cloud file from metadata provided by the symbolic link; deleting the symbolic link; copying content of the cloud file to the target file; and copying the path to the target file to a buffer to be returned to a kernel of an operating system.

According to other examples, the method may further include redirecting to a primary file system of the operating system to allow an operation on the target file to be completed. The primary file system may be an operating system specific file system (OSSFS). Determining the path to the target file from the symbolic link may include retrieving an entity identifier for the target file being represented as a placeholder in the placeholder VFS; and retrieving a metadata string that describes one or more properties about the target file. The one or more properties may include a name and a size of the target file. The method may also include implementing the placeholder VFS as a loadable kernel extension.

According to further examples, the method may include mounting the placeholder VFS in an empty, hidden folder within the operating system. The placeholder VFS may be multithreaded and the method may include employing a ticket identifier associated with each hydration request to track multithreaded requests. Determining the path to the cloud file may include downloading the cloud file to a temporary location.

According to other examples, a computing device to provide symbolic link based placeholders for cloud stored data synchronization is described. The computing device may include a communication interface configured to facilitate communication between the computing device and a cloud storage service, a memory configured to store instructions, and one or more processors coupled to the memory. The one or more processors, in conjunction with the instructions stored in the memory, may be configured to receive, at a placeholder virtual file system (VFS), a lookup call from kernel of an operating system of the computing device; parse a target identified by a symbolic link associated with a target file based on the lookup call; return a confirmation to the kernel; in response to receiving one of a read and a write request associated with the target file, transmit a hydration request for the target file to a hydration daemon; allow the one of the read and write operation to be performed on the hydrated target file; and transmit a result of the performed operation to a primary file system of the operating system.

According to some examples, the confirmation may be a vnode created upon determination of a component name validity associated with the target file and parsing of a path string. The one or more processors may be further configured to in response to receiving the one of the read and the write request associated with the target file, determine whether the target file is already hydrated prior to transmitting the hydration request for the target file to the hydration daemon. The primary file system may be an operating system specific file system (OSSFS) that is configured to receive requests for operations on files and symbolic links, and forward the requests for the symbolic links to a target at the placeholder VFS. Files represented by the placeholder VFS may be abstractions of files managed by the cloud storage service.

According to further examples, a physical computer-readable memory device with instructions stored thereon to provide symbolic link based placeholders for cloud stored data synchronization is described. The instructions may include determining a path to a target file from a symbolic link bi-directionally directed to a placeholder virtual file system (VFS); determining a path to a cloud file from metadata provided by the symbolic link; copying content of the cloud file to the target file; copying the path to the target file to a buffer to be returned to a kernel of an operating system; and redirecting to a primary file system of the operating system to allow an operation on the target file to be completed.

According to yet other examples, determining the path to the cloud file may include streaming the cloud file from a network location. The operation may include a VFSOP_LOOKUP operation configured to pass a component name parameter and return a vnode in response to validation of a component name and parsing of a path string. The placeholder VFS may be configured to transmit a hydration request to a hydration daemon upon determining the target file is not hydrated. The instructions may further include enabling one or more of a read operation, a write operation, and a read/write operation on the hydrated target file upon completion of the hydration.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide symbolic link based placeholder files for cloud stored data synchronization, the method comprising:
    determining a path to a target file from a bidirectional symbolic link,
        where the bidirectional symbolic link points to a placeholder virtual file system (VFS),
        wherein the bidirectional symbolic link is at a location of the target file; and
        wherein the bidirectional symbolic link is a file independent of the target file;
    determining a path to a cloud file from metadata provided by the bidirectional symbolic link;
    after determining the path to the cloud file, deleting the bidirectional symbolic link, wherein deleting the bidirectional symbolic link does not affect the target file;
    after deleting the bidirectional symbolic link, copying content of the cloud file to the target file; and
    copying the path to the target file to a buffer to be returned to a kernel of an operating system.

2. The method of claim 1, further comprising:
    redirecting a request for an operation associated with the target file directed to the placeholder VFS to a primary file system of the operating system to allow the operation on the target file to be completed.

3. The method of claim 2, wherein the primary file system is an operating system specific file system (OSSFS).

4. The method of claim 1, wherein determining the path to the target file from the bidirectional symbolic link comprises:
    retrieving, from the bidirectional symbolic link, an entity identifier for the target file being represented as a placeholder in the placeholder VFS; and
    retrieving a metadata string from the bidirectional symbolic link that describes one or more properties about the target file.

5. The method of claim 4, wherein the one or more properties include a name and a size of the target file.

6. The method of claim 1, further comprising:
    implementing the placeholder VFS as a loadable kernel extension.

7. The method of claim 1, further comprising:
    mounting the placeholder VFS in an empty, hidden folder within the operating system.

8. The method of claim 1, wherein the placeholder VFS is multithreaded.

9. The method of claim 8, further comprising:
employing a ticket identifier associated with each hydration request to track multithreaded requests.

10. The method of claim 1, wherein determining the path to the cloud file comprises:
downloading the cloud file to a temporary location.

11. A computing device to provide symbolic link based placeholder files for cloud stored data synchronization, the computing device comprising:
a communication interface configured to facilitate communication between the computing device and a cloud storage service;
a memory configured to store instructions; and
one or more processors coupled to the memory, the one or more processors, in conjunction with the instructions stored in the memory, are configured to:
receive, at a placeholder virtual file system (VFS), a lookup call from kernel of an operating system of the computing device;
parse a target identified by a bidirectional symbolic link associated with a target file based on the lookup call,
wherein the bidirectional symbolic link provides metadata describing at least one property of the target file;
wherein the bidirectional symbolic link points to the placeholder VFS;
wherein the bidirectional symbolic link is at a location of the target file; and
wherein the bidirectional symbolic link is a file independent of the target file;
return a confirmation to the kernel;
in response to receiving one of a read and a write request associated with the target file, transmit a hydration request for the target file to a hydration daemon;
after transmitting the hydration request, instructing the hydration daemon to delete the bidirectional symbolic link;
allow the one of the read and write operation to be performed on the hydrated target file; and
transmit a result of the performed operation to a primary file system of the operating system.

12. The computing device of claim 11, wherein the confirmation is a vnode created upon determination of a component name validity associated with the target file and parsing of a path string.

13. The computing device of claim 11, wherein the one or more processors are further configured to:
in response to receiving the one of the read and the write request associated with the target file, determine whether the target file is already hydrated prior to transmitting the hydration request for the target file to the hydration daemon.

14. The computing device of claim 11, wherein the primary file system is an operating system specific file system (OSSFS) that is configured to receive requests for operations on files and bidirectional symbolic links, and forward the requests for the bidirectional symbolic links to a target at the placeholder VFS.

15. The computing device of claim 11, wherein files represented by the placeholder VFS are abstractions of files managed by the cloud storage service.

16. A physical computer-readable memory device with instructions stored thereon to provide symbolic link based placeholder files for cloud stored data synchronization, the instructions comprising:
determining a path to a target file from a bidirectional symbolic link,
where the bidirectional symbolic link points to a placeholder virtual file system (VFS),
wherein the bidirectional symbolic link includes metadata describing at least one property of the target file, the at least one property being one of a file name and a file size;
wherein the symbolic link is at a location of the target file; and
wherein the bidirectional symbolic link is a file independent of the target file;
determining a path to a cloud file from metadata provided by the symbolic link;
after determining the path to the cloud file, deleting the bidirectional symbolic link, wherein deleting the bidirectional symbolic link does not affect the target file;
after deleting the bidirectional symbolic link, copying content of the cloud file to the target file;
copying the path to the target file to a buffer to be returned to a kernel of an operating system; and
redirecting a request for an operation associated with the target file directed to the placeholder VFS to a primary file system of the operating system to allow the operation on the target file to be completed.

17. The computer-readable memory device of claim 16, wherein determining the path to the cloud file comprises:
streaming the cloud file from a network location.

18. The computer-readable memory device of claim 16, wherein the operation includes a VFSOP_LOOKUP operation configured to pass a component name parameter and return a vnode in response to validation of a component name and parsing of a path string.

19. The computer-readable memory device of claim 16, wherein the placeholder VFS is configured to transmit a hydration request to a hydration daemon upon determining the target file is not hydrated.

20. The computer-readable memory device of claim 19, wherein the instructions further comprise:
enabling one or more of a read operation, a write operation, and a read/write operation on the hydrated target file upon completion of the hydration.

* * * * *